US012106673B2

United States Patent
Larminier

(10) Patent No.: US 12,106,673 B2
(45) Date of Patent: Oct. 1, 2024

(54) DATA DISPLAY SYSTEM FOR AN AIRCRAFT

(71) Applicant: AIRBUS HELICOPTERS, Marignane (FR)

(72) Inventor: Herve Larminier, Pelissanne (FR)

(73) Assignee: AIRBUS HELICOPTERS, Marignane (FR)

( * ) Notice: Subject to any disclaimer, the term of this patent is extended or adjusted under 35 U.S.C. 154(b) by 253 days.

(21) Appl. No.: 17/714,571

(22) Filed: Apr. 6, 2022

(65) Prior Publication Data
US 2022/0319342 A1   Oct. 6, 2022

(30) Foreign Application Priority Data
Apr. 6, 2021   (FR) ...................................... 2103481

(51) Int. Cl.
G08G 5/00   (2006.01)
G01D 7/06   (2006.01)
G02B 27/01   (2006.01)

(52) U.S. Cl.
CPC ............ *G08G 5/0047* (2013.01); *G01D 7/06* (2013.01); *G02B 27/0101* (2013.01); *G01D 2207/10* (2021.05); *G02B 2027/0141* (2013.01)

(58) Field of Classification Search
CPC .... G08G 5/0047; G01D 7/06; G01D 2207/10; G02B 27/0101; G02B 2027/0141
USPC .......................................................... 701/3
See application file for complete search history.

(56) References Cited

U.S. PATENT DOCUMENTS

| | | | | |
|---|---|---|---|---|
| 6,038,498 A * | 3/2000 | Briffe | ..................... | G01C 23/00 701/14 |
| 10,850,864 B2 | 12/2020 | Lyons et al. | | |
| 2006/0235581 A1* | 10/2006 | Petillon | ................ | G08G 5/0078 701/3 |
| 2014/0236395 A1 | 8/2014 | Guillet et al. | | |

(Continued)

FOREIGN PATENT DOCUMENTS

| FR | 3000196 A1 | 6/2014 |
|---|---|---|
| FR | 3013834 A1 | 5/2015 |

OTHER PUBLICATIONS

Kassab M A et al: "A novel voting algorithm for redundant aircraft sensors", Proceeding of the 11th World Congress on Intelligent Control and Automation, IEEE, Jun. 29, 2014 (Jun. 29, 2014), pp. 3741-3746 XP032743106, DOI: 10.1109/WCICA.2014.7053339.

(Continued)

*Primary Examiner* — Mahmoud S Ismail
(74) *Attorney, Agent, or Firm* — Brooks Kushman P.C.

(57) ABSTRACT

A piloting assistance system for assisting the piloting of a vehicle, the piloting assistance system comprising at least one display and a plurality of sensors for each measuring a value of a given parameter, the at least one display being configured to display a symbol carrying the value, the plurality of sensors comprising redundant sensors with a redundancy of order three or higher. The piloting assistance system comprises a display controller configured to select, according to stored logic, a selected sensor from the plurality of sensors, the at least one display using the value of the parameter measured with the selected sensor to display the symbol.

10 Claims, 2 Drawing Sheets

(56) References Cited

U.S. PATENT DOCUMENTS

2015/0148997 A1* 5/2015 Brot ..................... G01P 21/025
701/3

OTHER PUBLICATIONS

French Search Report for French Application No. FR2103481, Completed by the French Patent Office, Dated Jan. 27, 2022, 8 pages.

* cited by examiner

DATA DISPLAY SYSTEM FOR AN AIRCRAFT

CROSS-REFERENCE TO RELATED APPLICATIONS

This application claims priority to French patent application No. FR 21 03481 filed on Apr. 6, 2021, the disclosure of which is incorporated in its entirety by reference herein.

TECHNICAL FIELD

The present disclosure relates to a data display system for an aircraft.

BACKGROUND

An aircraft comprises a display system for displaying information in order to assist a pilot. Such a system is sometimes referred to by the acronym "ICDS", standing for "Integrated Cockpit Display System".

The display system may be configured to display information that is useful for a pilot. The term "information" may refer to symbols that include geometric shapes, numbers and letters; these symbols may vary over time and may, in particular, represent physical quantities.

This information includes information considered by a person skilled in the art to be "primary information" and information considered to be "secondary information".

Primary information relates to short-term piloting information, or indeed information that is essential for piloting. Short-term piloting information may comprise, in particular, at least one attitude angle of the aircraft, a heading hold, an air speed of the aircraft, a rate of climb, for example measured with a vertical speed indicator, a pressure altitude of the aircraft, a height of the aircraft, for example measured with a radio altimeter, a load factor of the aircraft, navigation data, first limit information relating to a power plant of the aircraft, and possibly alarms, if any. For example, a display displaying short-term primary information may display a speed vector symbol, an attitude scale, an altitude scale, a speed scale and a roll angle scale, a heading, and various alarms. Essential piloting information comprises short-term piloting information together with additional information considered to be essential for piloting a given aircraft, such as, for example, a speed of rotation of a rotary wing on a rotorcraft, the quantity of fuel remaining in the aircraft, and alert messages.

Secondary information covers all the other information that can be displayed, for example weather data, data for setting a desired course, data relating to oil pressures and/or temperatures, gas pressures and/or temperatures, indications relative to a source of electrical energy such as a voltage, fuel pressures, tire pressures, landing gear extension data, images from a surveillance camera, data relating to an on-board winch, etc.

In order to present these various items of information to a pilot, an aircraft may include various displays. In this context, an aircraft may comprise one or more displays in the form of "screens" and possibly "multifunction displays", arranged on an instrument panel and/or on a console in a cockpit.

For example, a "single-pilot" aircraft may comprise two multifunction displays that can be seen by the pilot. According to another example, a "two-pilot" aircraft may comprise two multifunction displays arranged facing the pilot, and two multifunction displays are arranged facing the co-pilot. According to another example, on a "two-pilot" aircraft, one multifunction display is arranged facing the pilot and one multifunction display is arranged facing the co-pilot, at least one third multifunction display being arranged laterally between the pilot and co-pilot.

A multifunction display may display various pages that can contain various information. Therefore, a multifunction display may display one page containing primary information, and one or more pages containing secondary information. A pilot can select the page that is to be displayed.

Moreover, the display system comprises various sensors for measuring the values of certain information to be displayed. Important sensors may be redundant, for safety reasons.

According to one prior art document, a two-pilot aircraft may comprise first and second main sets of sensors as well as a set of backup sensors each measuring information relative to at least one speed and attitude angles. The display system comprises a backup system displaying the information measured by the set of backup sensors. Moreover, the display system comprises a pilot display arranged in front of the pilot, a co-pilot display arranged in front of the co-pilot, and a three-position switch. The pilot or the co-pilot can maneuver the switch in order to display either the information measured with the first main set of sensors on the pilot and co-pilot displays, the information measured with the second main set of sensors on the pilot and co-pilot displays, or the information measured with the first main set of sensors on the pilot display and the information measured with the second main set of sensors on the co-pilot display. The pilot or the co-pilot can choose the valid main set of sensors depending on the information displayed on the backup display.

This prior art thus proposes a manual switch maneuvered by a pilot or a co-pilot in order to manually select the set of sensors providing information to the displays. This has an impact on the pilot's workload.

Document U.S. Pat. No. 10,850,864 describes a display system that comprises a first measurement system and a second measurement system as well as a comparator. The comparator can determine whether the data measured by the measurement systems is corrupted, by comparing it with ideal data contained in a database. According to one embodiment, the comparator is arranged upstream of critical systems, the comparator then being able to alter corrupted data. According to one embodiment, the comparator is arranged in parallel with critical systems, the comparator then being able to make the critical systems operate in a degraded mode.

The following documents are also known, and describe methods for analyzing measurements: FR 3 013 834 A1, FR 3 000 196 A1 and KASSAB M A ET AL: "A novel voting algorithm for redundant aircraft sensors", PROCEEDING OF THE 11TH WORLD CONGRESS ON INTELLIGENT CONTROL AND AUTOMATION, IEEE, 29 Jun. 2014 (2014-06-29), pages 3741-3746 XP032743106, DOI: 10.1109/WCICA.2014.7053339.

SUMMARY

The object of the present disclosure is therefore to propose a system intended to allow the display of data that has integrity, i.e., data that is accurate and therefore not erroneous, without the intervention of a pilot.

The disclosure relates to a piloting assistance system for assisting the piloting of a vehicle as claimed, the piloting assistance system comprising at least one display, in particular several displays, and at least one set of sensors having a plurality of sensors each measuring a value of a given parameter, each display of said at least one display being configured to display a symbol carrying said value, said plurality of sensors comprising redundant sensors with a redundancy of order three or higher.

The piloting assistance system comprises a display controller configured, for example at least in an automatic operating mode, to select, according to a stored logic, a selected sensor from said plurality of sensors, each display of said at least one display using the value of said parameter measured with said selected sensor to display said symbol.

The expression "each display of said at least one display" refers to all the displays of the system, irrespective of the number of displays and, for example, in the presence of one or more displays.

The expression "at least in an automatic operating mode" means that the piloting assistance system can apply the method of the disclosure to automatically choose the selected sensor either all the time in the presence of a single operating mode or at least during an operating mode referred to as the "automatic operating mode" in the presence of several operating modes.

In the presence of several operating modes, the automatic operating mode of the disclosure may be a default mode. In the presence of several operating modes, the system may comprise an interface enabling a pilot to choose the selected sensor. The interface transmits, for example, a signal to the display controller, this signal carrying the choice that has been made. The display controller is then also configured to select a specific sensor depending on the signal received.

The description refers to the automatic operating mode.

For at least one parameter, the piloting assistance system therefore comprises a set of sensors capable of measuring a value of this parameter. The disclosure may apply to several parameters using respective sets of sensors. For example, the piloting assistance system may comprise a set of sensors measuring values of an attitude angle, a set of sensors measuring values of a heading angle, a set of sensors measuring values of a speed and/or a set of sensors measuring values of a height. A given sensor may belong to several sets of sensors. For example, an inertial unit may be used to measure various angles and speeds.

At any time, and at least in the automatic operating mode, the display controller analyses the signals transmitted by the sensors of one or more sets of sensors. The display controller is therefore configured to select a sensor referred to as the "selected sensor" from each set of sensors. The display or displays can then display a symbol that varies as a function of the value measured by this selected sensor. Such a symbol may be in the form of a number, an index that moves in relation to a fixed scale, a scale that moves in relation to a fixed index, a background whose appearance varies depending on the value in question, etc.

Therefore, this system is an automatic system which, at any time and at least in the automatic operating mode, chooses a sensor deemed to have integrity to measure the value of a parameter. The system therefore makes it possible to automatically reconfigure the selected sensor or sensors to be used by the display or displays.

The expression "display being configured to display a symbol carrying said value" means that the display in question can display, automatically or on request, a symbol representing the value measured by the corresponding selected sensor.

This helps optimize a pilot's workload, at least in the automatic operating mode. Indeed, the pilot has no need to compare various sources in order to evaluate the value of the parameter in question. The display or displays always operate in an optimal mode, and not in a degraded mode. Moreover, the display controller does not influence the value of the displayed parameter and therefore does not run the risk of altering it. The display controller chooses a specific sensor according to a predetermined logic that makes it possible to identify a sensor that has integrity for each parameter. For example, the display controller transmits a signal carrying the value measured by the selected sensor to the display or displays. For example, the signal may be a digital signal carrying the value in question or an analogue signal having a shape that varies as a function of said value. In the presence of several displays, the disclosure thus makes it possible to harmonize the primary sources, i.e., the sensors, used by the displays.

The piloting assistance system may in particular comprise one or more of the following features, taken individually or in combination.

According to a first variant, said display controller is configured to choose said selected sensor by applying a median-of-medians algorithm.

An explanation of such a median-of-medians algorithm can be found in the literature.

The selected sensor is then the sensor providing a median value out of all the values determined by all the sensors of a set of sensors.

According to a second variant, the display controller can be configured to calculate an average of the values measured by the sensors of said plurality of sensors of a set of sensors, said display controller selecting said selected sensor depending on said average.

The display controller can implement a conventional algorithm in order to determine the average of the values measured by the sensors of a given set of sensors. Depending on this average, the display controller chooses the selected sensor for this set of sensors.

For example, the selected sensor may be the sensor of a set of sensors measuring a value closest to the average.

According to another example, the display controller may choose the selected sensor from a list of sensors ranked in a particular order, the selected sensor being the first sensor of the list that differs from the average by less than a predetermined threshold.

According to a third alternative or additional variant, said plurality of sensors may comprise a number of groups greater than one, each group comprising at least one of said sensors, said groups being ranked according to a ranking order ranging from a highest-ranked group to a lowest-ranked group, said display controller selecting a sensor from the first group deemed to have integrity, starting from the highest-ranked group according to said ranking order.

For example, the system may apply the first variant for a set of sensors relative to a first parameter and/or the second variant or the third variant for a second set of sensors relative to a second parameter.

According to the third variant, the sensors of a set of sensors are each assigned to a group, and the groups of a set of sensors are ranked. If the highest-ranked group is deemed by the controller to have integrity, the selected sensor is a predetermined sensor from this group. If not, the controller analyses the next group, and so on as long as a sensor is not selected, until the lowest-ranked group is reached.

Said plurality of sensors of a set of sensors may comprise at least three groups, for example.

Each group apart from the lowest-ranked group may comprise at least two sensors. The lowest-ranked group may also comprise at least two sensors. At least the groups ranked above the lowest-ranked group may comprise redundant sensors with a redundancy of at least two.

According to one possibility, the display controller may be configured to consider that a group has integrity when the at least two sensors of this group determine values equal to each other to within a predetermined margin for said parameter.

If the sensors of a group measure substantially equivalent values for a parameter, this group is considered by the controller to have integrity.

According to one possibility, at least two of said groups comprise dissimilar sensors.

The term "dissimilar" means that the sensors operate using different technologies or different suppliers. For example, a height may be measured using a radio altimeter or a barometric system, or indeed by means of radio altimeters provided by different suppliers.

For example, a set of sensors measuring values of a given parameter may have a redundancy of order 5 and may have a dissimilarity of order 3. For example, this set of sensors then comprises a highest-ranked group having two similar sensors, an intermediate group having two similar sensors and a lowest-ranked backup group having one sensor, the sensors of the highest-ranked group being dissimilar from the sensors of the intermediate group and the sensor of the lowest-ranked group, the sensors of the intermediate group and the sensor of the lowest-ranked group also being dissimilar.

According to one possibility, said ranking order may be an order established as a function of a level of precision of the sensors.

The term "precision" refers to the accuracy of the measurement made.

Therefore, the highest-ranked group has one or more sensors that are more precise than any other sensor of another group, said lowest-ranked group having one or more sensors that are less precise than any other sensor of another group.

For example, a set of sensors measuring values of a given parameter may have a group having at least one very precise sensor, a group having at least one precise sensor, and a group having at least one less precise sensor.

Regardless of the variant and according to one possibility compatible with the preceding possibilities, the display controller may comprise at least two computers, each computer comprising at least two processing paths or channels each configured to implement said stored logic in a predefined order.

The display controller may comprise two dual computers, for safety reasons.

Regardless of the variant and according to one possibility compatible with the preceding possibilities, said piloting assistance system may comprise an autopilot system, the autopilot system comprising at least one actuator acting on a control member, the autopilot system comprising a flight controller communicating with the display controller, the flight controller being configured to control said at least one actuator depending on said value measured by said selected sensor.

Therefore, the display or displays display a value for a parameter that is consistent with the value used by the autopilot system. The pilot can then view the value of the parameter taken into account by the autopilot system.

According to another aspect, a vehicle may comprise a piloting assistance system according to the disclosure.

This disclosure also relates to a method implemented by such a system. Thus, the disclosure relates to a method for determining, at least in an automatic operating mode, a value that has integrity of a parameter, with a piloting assistance system, the piloting assistance system comprising at least one display and at least one set of sensors having a plurality of sensors for each measuring a value of a given parameter, each display of said at least one display being configured to display a symbol carrying said value, said plurality of sensors comprising redundant sensors with a redundancy of order three or higher.

The method comprises selecting, with a display controller, according to a stored logic, a selected sensor from said plurality of sensors, each display of said at least one display using the value of said parameter measured with said selected sensor to display said symbol.

The method may in particular comprise one or more of the following features, taken individually or in combination.

According to one possibility, the method may comprise calculating, with the display controller, an average of the values measured by the sensors of said plurality of sensors, said display controller selecting said selected sensor depending on said average.

For example, the selected sensor is the sensor measuring the value closest to the average.

According to one possibility compatible with the preceding possibilities, said selected sensor may be the sensor of said plurality of sensors measuring a value closest to said average.

According to one possibility, the method comprises determining the selected sensor with the display controller by applying a median-of-medians algorithm.

According to one possibility compatible with the preceding possibilities, said plurality of sensors being able to comprise a number of groups greater than one, each group comprising at least one of said sensors, said groups being ranked according to a ranking order ranging from a highest-ranked group to a lowest-ranked group, said method comprises selecting, with the controller, a sensor from the first group deemed to have integrity, starting from the highest-ranked group according to said ranking order.

According to one possibility compatible with the preceding possibilities, the method may comprise ranking a group as a group that has integrity when at least two sensors of this group determine values equal to each other to within a predetermined margin for said parameter.

According to one possibility compatible with the preceding possibilities, said piloting assistance system may comprise an autopilot system, the autopilot system comprising at least one actuator acting on a control member, the autopilot system comprising a flight controller communicating with the display controller, the method comprising controlling the at least one actuator with the flight controller depending on said value measured by said selected sensor.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
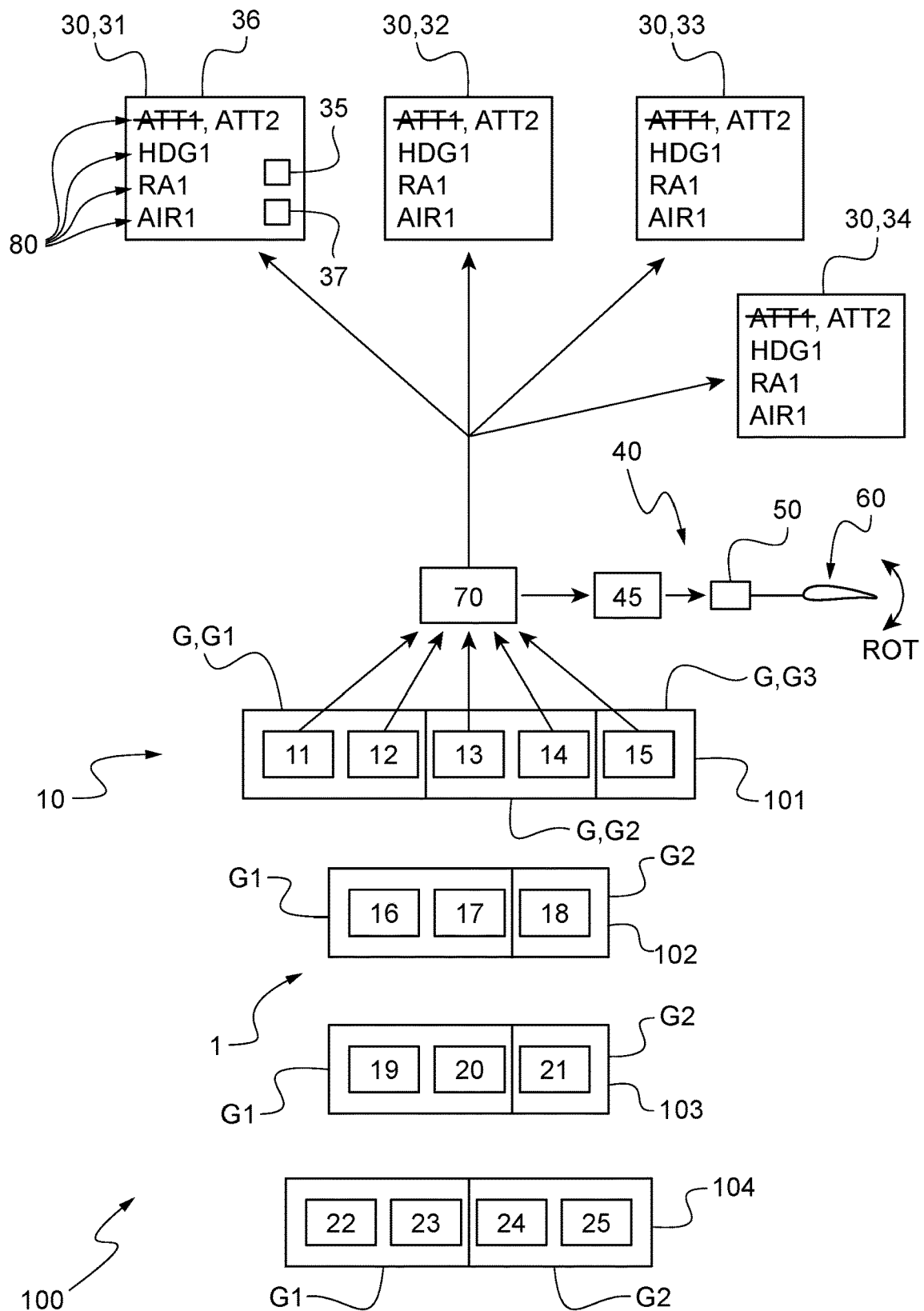
FIG. 1 shows a piloting assistance system according to the disclosure for a vehicle.

FIG. 1 shows a piloting assistance system 1 arranged in a vehicle 100. For example, this vehicle 100 is a land or sea vehicle, or an aircraft. For example, the vehicle 100 comprises a rotary wing provided with control members 60 such as blades.

Irrespective of the nature of the vehicle 100, the piloting assistance system 1 comprises at least one display 30. Reference 30 denotes any display, and references 31 to 34 denote specific displays. The expression "each display" may be used equally in the presence of a single display or several displays.

According to the example shown, the piloting assistance system 1 may comprise at least one pilot display 31 arranged facing a pilot, and/or at least one co-pilot display 33 arranged facing a co-pilot, and optionally one or more central displays 32, 34 arranged between the pilot and the co-pilot, in a transverse direction.

The display or displays 30 may comprise a screen 36, and indeed a control unit 37 controlling the screen 36 depending on input signals and/or signals transmitted by one or more human-machine interfaces 35 of the display 30. The display or displays 30 can communicate with each other. The control unit 37 of a display 30 may comprise a processing computer. The control unit 37 of a display may form a single piece of equipment with the screen 36 or may be remote from the screen 36.

The term "computer" refers to an object that may have at least one processor and at least one memory, at least one integrated circuit, at least one programmable system, or at least one logic circuit, these examples not limiting the scope to be given to the term "computer". The term "processor" may refer equally to a central processing unit (CPU), a graphics processing unit (GPU), a digital signal processor (DSP), a microcontroller, etc.

The term "signal" refers to a signal carrying at least one piece of data; the signal may be analogue, digital, optical or electrical, for example.

Irrespective of the nature of the vehicle 100 and the number of displays 30, the piloting assistance system 1 comprises a plurality of sensors 10. Reference 10 denotes any sensor, and references 11 to 25 denote specific sensors.

The term "sensor" refers to a device comprising at least one sensing device and indeed a processing unit, such as a measuring computer, this device emitting at least one signal directly or indirectly carrying the value of at least one parameter.

In particular, the piloting assistance system 1 comprises several sensors 10 each measuring a value of the same given parameter and forming a set 101, 102, 103, 104 of sensors 10. The piloting assistance system 1 comprises at least one set of sensors. According to the example shown, four sets 101, 102, 103, 104 of sensors 10 may respectively measure four different parameters.

The number of sensors 10 per set 101, 102, 103, 104 of sensors is provided in FIG. 1 for illustrative purposes. In particular, each set 101, 102, 103, 104 of sensors may comprise sensors 10 with a redundancy at least of order three, and may therefore comprise at least three sensors 10 measuring, in particular, a given parameter. For example, a set of sensors may have a redundancy of order 3, 4, or 5, and a dissimilarity of order 2 or 3. According to one example, a set of sensors may have a redundancy of order 3 or 4 and a dissimilarity of order 2. According to another example, a set of sensors may have a redundancy of order 5 and a dissimilarity of order 3.

For example, the piloting assistance system 1 may comprise a set 101 of sensors 11, 12, 13, 14, 15 measuring values of at least an attitude angle, a set 102 of sensors 16, 17, 18 measuring values of a heading angle, a set 103 of sensors 19, 20, 21 measuring values of a speed and/or a set 104 of sensors 22, 23, 24, 25 measuring values of a height. A single sensor may belong to several sets of sensors.

For example, the set 101 of sensors may comprise at least one sensor 10, and two sensors 11, 12 according to FIG. 1, referred to by the acronym "AHRS", standing for "Attitude and Heading Reference System", at least one inertial unit and two inertial units 13, 14 according to FIG. 1, and an inclinometer 15. Such a set 101 of sensors then has a redundancy of order 5, having five sensors, and has a dissimilarity of order 3, having sensors that function using three different technologies.

For example, the set 102 of sensors may comprise at least one magnetic compass 16, at least one gyroscopic compass 17, at least one conventional compass 18, etc.

For example, the set 103 of sensors may comprise at least three air speed systems 19, 20, 21, etc.

For example, the set 104 of sensors may comprise at least four radio altimeters 22, 23, 24, 25, etc.

Irrespective of the number of sensors 10, the sensors 10 of a given set of sensors may be distributed into groups. Therefore, a set of sensors may be divided into at least two groups G, each group G comprising at least one sensor 10.

Moreover, the groups G of a set of sensors may be ranked according to a ranking order ranging from a highest-ranked group to a lowest-ranked group. According to the example of FIG. 1, the highest-ranked group G1 of the set of sensors 101 comprises two sensors 11, 12, a mid-ranked group G2 comprises two sensors 13, 14 and the lowest-ranked group G3 comprises one sensor 15.

The ranking order may be an order established as a function of a level of precision of the sensors 10. Therefore, and in reference, for example, to the set 101 of sensors of FIG. 1, the sensors 11, 12 of the highest-ranked group G1 are more precise than the sensors 13, 14 of the intermediate group, the sensors 13, 14 of the intermediate group themselves being more precise than the sensor 15 of the lowest-ranked group G3.

According to one possibility, each group G apart from the lowest-ranked group G3 comprises at least two sensors 10. The lowest-ranked group G3 may comprise at least one sensor 10.

Moreover, at least two groups G may comprise dissimilar sensors 10.

According to another aspect, the piloting assistance system 1 comprises a display controller 70.

The display controller 70 may for example comprise one or more display computers, or indeed a computer of a display 30 or the like. For example, the display controller 70 may comprise two two-channel/two-path display computers, at least one path/channel applying the method of the disclosure at any point in time. For example, a first path of a first computer is used as long as it is functioning correctly. If the first path of the first computer fails, a first path of the second computer applies the method. If the first path of the second computer fails, a second path of the second computer applies the method. Finally, if the second path of the second computer also fails, a second path of the first computer applies the method.

The display controller 70 may be connected directly or indirectly, via wired or wireless links, to each sensor 10 and to each display 30. Similarly, each display 30 may be connected directly or indirectly, via wired or wireless links, to each sensor 10.

The piloting assistance system 1 may comprise an autopilot system 40. The autopilot system 40 comprises at least one actuator 50 acting on a control member 60. The expression "control member" refers to a member used to pilot/fly the vehicle.

By way of illustration, the control member 60 may be a blade of a rotary wing. Moving the actuator 50 causes the blade to rotate ROT about its pitch axis. For example, the actuator 50 is linked by a control linkage to a servo-control engaged on a set of swashplates, each blade being linked to this set of swashplates by a pitch rod.

According to another example, the control member 60 may be a blade of another rotor or indeed a propeller, a flap, a wheel, etc.

The autopilot system 40 further comprises a flight controller 45 communicating with the display controller 70 via a wired or wireless link. The flight controller 45 may comprise at least one flight control computer, for example together with the display controller 70.

Irrespective of the constitution of the piloting assistance system 1, the display controller 70 is in particular configured to apply the method of the disclosure at least during an automatic operating mode, by selecting, according to a stored logic, a selected sensor 10 from the sensors 10 of a set of sensors, the display or displays 30 using the value of the parameter measured with the selected sensor 10 to display a symbol 80.

Figure 2:
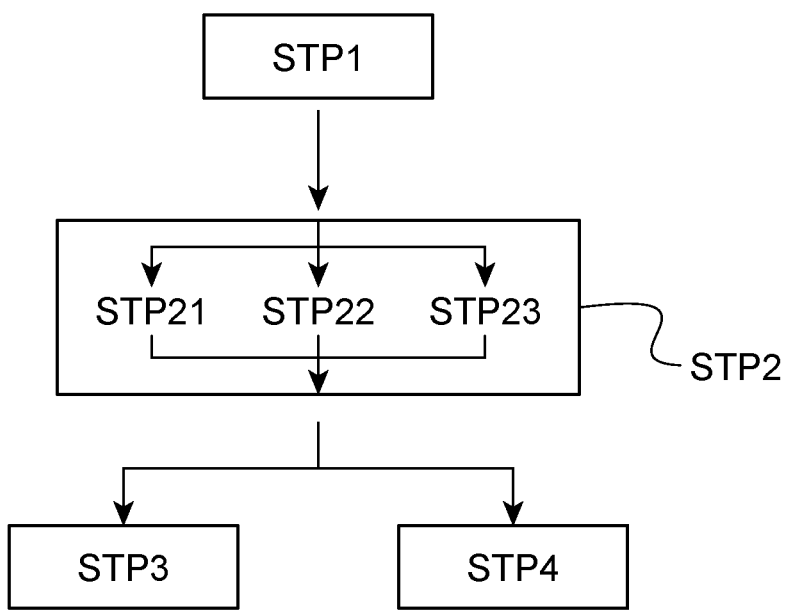
FIG. 2 is a diagram showing the method implemented by such a system.

FIG. 2 shows such a method.

During a preliminary step STP1, each sensor 10 transmits a measurement signal carrying the value of the parameter that it measures. The display controller 70 receives the various measurement signals.

For each parameter, the method comprises selecting STP2, with the display controller 70, according to a logic stored in this display controller 70, a sensor 10 referred to as the "selected sensor" from the plurality of sensors 10 measuring this parameter.

According to one variant, the method comprises, for this purpose, calculating STP21, with the display controller 70, an average of the values measured by the sensors 10 of a given set of sensors 10. The display controller 70 then selects a selected sensor 10 from the set of sensors depending on this average, for example by taking the sensor measuring the value closest to the average.

According to one variant, the method comprises determining STP22 the selected sensor 10, with the display controller 70, by applying a median-of-medians algorithm to the values measured by each sensor 10 of the set of sensors in question.

According to one variant applicable with a set of sensors divided into several groups, the method comprises selecting STP23, with the display controller 70, a sensor 10 from the first group deemed to have integrity, starting from the highest-ranked group G1 according to the ranking order. The lowest-ranked group is, for example, always deemed to have integrity.

In the presence of several sensors 10, a group G is considered by the display computer 70 to have integrity when the sensors 10 of this group G determine values equal to each other to within a predetermined margin for said parameter. To this end, the display computer 70 may compare the measurements made by the sensors of the group. For example, for a group G with several sensors 10, if the value measured by one of the sensors 10 is equal to the value measured by each other sensor 10, plus or minus said margin, the group has integrity.

In the presence of a single sensor 10, a group G is considered by the display computer 70 to have integrity, for example, when the sensor 10 of this group determines a value equal to an average of the values of the other groups, to within a predetermined margin.

Irrespective of how the selected sensor 10 is determined, the method comprises each display 30 using the value of the parameter measured with only the selected sensor 10 from the set of sensors in question. One or more displays 30 may then display a symbol 80 representing this value during a step STP3.

For example, the display controller 70 transmits, to at least one or indeed to each display 30, the value of the parameter measured with the selected sensor, or indicates, to at least one or indeed to each display, which is the selected sensor 10 to be taken into consideration, or closes a switch connecting the selected sensor and the display.

In the presence of an autopilot system 40, this autopilot system 40 may use the value of the parameter measured with the selected sensor 10 to pilot the vehicle 100 during an autopilot step STP4.

In reference to FIG. 1, each display 30 may for example display a symbol ATT1 corresponding to the value of an attitude angle measured with a selected sensor 11 from the set of sensors 101, and/or a symbol HDG1 corresponding to the value of a heading measured with a selected sensor 16 from the set of sensors 102, and/or a symbol AIR1 corresponding to the value of a speed measured with a selected sensor 19 from the set of sensors 103, and/or a symbol RA1 corresponding to the value a height measured with a selected sensor 22 from the set of sensors 104.

If the display controller 70 determines that the sensor 11 from the set of sensors 101 no longer has integrity, the display controller 70 determines that the sensor 13, for example, becomes the new selected sensor for the set of sensors 101. Therefore, each display 30 can display a symbol ATT2 corresponding to the value of an attitude angle measured with the selected sensor 13 from the set of sensors 101. This change is shown by the references crossed out in FIG. 1.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A piloting assistance system for assisting the piloting of a vehicle, the piloting assistance system comprising a plurality of displays and at least one set of sensors comprising a plurality of sensors each measuring a value of a given parameter, each display being configured to display a symbol carrying the value, the plurality of sensors comprising redundant sensors with a redundancy of order three or higher, wherein the piloting assistance system comprises a display controller configured to select, at least in an automatic operating mode, according to a stored logic, a selected sensor from the plurality of sensors, each display using the value of the parameter measured with the selected sensor to display the symbol; and wherein the plurality of sensors comprises a number of groups greater than one, each group comprising at least one of the sensors, the groups being ranked according to a ranking order ranging from a highest-ranked group to a lowest-ranked group, the display controller selecting a sensor from the first group deemed to have integrity, starting from the highest-ranked group according to the ranking order.

2. The piloting assistance system according to claim 1, wherein each group apart from the lowest-ranked group comprises at least two sensors.

3. The piloting assistance system according to claim 2, wherein the display controller is configured to consider that a group has integrity when the at least two sensors of this group determine values equal to each other to within a predetermined margin for the parameter.

4. The piloting assistance system according to claim 1, wherein at least two of the groups comprise dissimilar sensors.

5. The piloting assistance system according to claim 1, wherein the ranking order is an order established as a function of a level of precision of the sensors.

6. The piloting assistance system according to claim 1, wherein the piloting assistance system comprises an autopilot system, the autopilot system comprising at least one actuator acting on a control member, the autopilot system comprising a flight controller communicating with the display controller, the flight controller being configured to control the at least one actuator depending on the value measured by the selected sensor.

7. The piloting assistance system according to claim 1, wherein the piloting assistance system is arranged in a vehicle.

8. A method for determining a value that has integrity of a parameter, with a piloting assistance system, the piloting assistance system comprising a plurality of displays and at least one set of sensors having a plurality of sensors each measuring a value of a given parameter, each display being configured to display a symbol carrying the value, the plurality of sensors comprising redundant sensors with a redundancy of order three or higher, wherein the method comprises selecting, at least in an automatic operating mode, with a display controller, according to a stored logic, a selected sensor from the plurality of sensors, each display using the value of the parameter measured with the selected sensor to display the symbol; and wherein the plurality of sensors comprises a number of groups greater than one, each group comprising at least one of the sensors, the groups being ranked according to a ranking order ranging from a highest-ranked group to a lowest-ranked group, the method comprising selecting, with the controller, a sensor from the first group deemed to have integrity, starting from the highest-ranked group according to the ranking order.

9. The method according to claim 8, wherein the method comprises ranking a group as a group that has integrity when at least two sensors of this group determine values equal to each other to within a predetermined margin for the parameter.

10. The method according to claim 8, wherein the ranking order is an order established as a function of a level of precision of the sensors.

* * * * *